United States Patent [19]

Anezaki et al.

[11] Patent Number: 5,418,963
[45] Date of Patent: May 23, 1995

[54] PROTOCOL ENCODING/DECODING DEVICE CAPABLE OF EASILY INPUTTING/REFERRING TO A DESIRED DATA VALUE

[75] Inventors: Akihiro Anezaki, Tokyo; Yasutaka Ushijima, Fukuoka, both of Japan

[73] Assignee: NEC Corporation, Tokyo, Japan

[21] Appl. No.: 51,219

[22] Filed: Apr. 23, 1993

[30] Foreign Application Priority Data

Apr. 23, 1992 [JP] Japan ................................. 4-104455

[51] Int. Cl.$^6$ .............................................. G06F 13/42
[52] U.S. Cl. ............................... 395/700; 364/DIG. 1; 364/240.8
[58] Field of Search ......................... 395/200, 500, 700

[56] References Cited

U.S. PATENT DOCUMENTS

| | | | |
|---|---|---|---|
| 5,210,535 | 5/1993 | Fujita | 395/200 X |
| 5,263,137 | 11/1993 | Anezaki | 395/200 |
| 5,291,583 | 3/1994 | Bapat | 395/500 |

FOREIGN PATENT DOCUMENTS

513799A1  11/1992  European Pat. Off.

OTHER PUBLICATIONS

Patent Abstracts of Japan, vol. 15, No. 144, (35 P 1189), 11, Apr. 1991, (corresponding to JP 3-19056 (A).
G. Neufeld, et al., "An Overview of ASN.1", Computer Networks and ISDN Systems, vol. 23, No. 5, Feb. 1992, pp. 393–415.

*Primary Examiner*—Thomas M. Heckler
*Attorney, Agent, or Firm*—Foley & Lardner

[57] ABSTRACT

In a protocol encoding/decoding device for use in syntax translation between an abstract syntax which is a set of data types described by an Abstract Syntax Notation One (ASN.1) and a transfer syntax, a structure generating unit (28) automatically generating, on the basis of a predetermined conversion rule, structures corresponding to data structure represented by the abstract syntax stored in the abstract syntax storage (10). The structures are stored in a structure storage (14). An AST generating unit (32) automatically generates an ASN.1 syntax tree (AST) which represents the data structure of the abstract syntax. The AST is stored in an AST storage (18). On encoding, a user program (26) inputs data values in the structure storage (14). On encoding, a VTL generating function (16G) automatically generates a VTL on the basis of the data values stored in the structure storage (14). On encoding, a PDU encoding/encoding unit (20) encodes the abstract syntax into a protocol data unit (PDU) on the basis of the AST and of the VTL. On decoding, the PDU encoding/decoding unit (20) decodes the PDU on the basis of the AST to generate a VTL. On decoding, a VTL referring function (16R) refers the VTL to store the data values in the structure storage (14). On decoding, the user program (26) refers to the data values stored in the structure storage (14).

2 Claims, 7 Drawing Sheets

FIG. 1

```
PDU : : =CHOICE {
        a INTEGER,
        b SEQUENCE {
                d IA5String OPTIONAL,
                e [0] BIT STRING,
                f [1] IMPLICIT NULL
        },
        c OCTET STRING
}
```

FIG. 2 b {d "ABC",e '101' B,f NULL}

FIG. 3

| ASN.1 TYPES | C DATA TYPES |
|---|---|
| BOOLEAN | char |
| INTEGER ENUMERATED | long |
| NULL | char* |
| SEQUENCE SET | Struct ... { <br> : <br> }; |
| SEQUENCE OF SET OF | Struct ... { <br> struct ...*next; <br> : <br> }; |
| CHOICE | Struct { <br> long id; <br> : <br> }; |
| OTHERS | Struct String { <br> long ing; <br> char *ptr; <br> }; |

FIG. 4

```
        Struct  String  {
                long ing ;
                char *ptr ;
};
Struct  b  {
        Struct  String  *d ;
        Struct  String   e ;
        char             *f ;
};
Struct  PDU  {
        long              id ;
        long               a ;
        Struct  b         *b ;
        Struct  String     c ;
};
```

FIG. 5

| | ID | LNG | PTR | |
|---|---|---|---|---|
| VTL[0] | b | { | | |
| | d | 3 | → | 41,42,43 |
| | e | 3 | → | A0 |
| | f | NULL | | |
| [4] | | } | | |

PROTOCOL ENCODING/DECODING DEVICE CAPABLE OF EASILY INPUTTING/REFERRING TO A DESIRED DATA VALUE

BACKGROUND OF THE INVENTION

This invention relates to a protocol encoding/decoding device for use in syntax conversion or translation between an abstract syntax and a transfer syntax.

As is well known in the art, a layer protocol of Open Systems Interconnection (OSI) consists of seven layers which comprise a physical layer, a data link layer, a network layer, a transport layer, a session layer, a presentation layer, and an application layer.

Attention will be directed to the presentation layer and the Application layer. In the application layer, its layer protocol is described in an abstract by using an Abstract Syntax Notation One (ASN.1) which is defined in International Organization for Standardization (ISO) 8824 and the International Telegraph and Telephone Consultive Committee (CCITT) Recommendation X.208. The ASN.1 is a programming language for describing complicated data structure in the application layer. The ASN.1, which is similar to a normal programming language, is capable of describing the complicated data structure consisting of a combination of simple data types. A set of data types described by ASN.1 is called the abstract syntax. The abstract syntax is independent from its coding format in a real system. In the presentation layer, the abstract syntax is encoded into the transfer syntax on the basis of the ASN.1 basic encoding rules which are defined in ISO 8825 and CCITT Recommendation X.209. A function of the application layer is realized by a function module called an application entity while another function of the presentation layer is realized by another function module called a presentation entity. The application entity represents semantices of data by using the abstract syntax. The transfer syntax represents syntax of data transferred between the presentation entities. Each OSI presentation layer protocol is represented as a set of Protocol Data Units (PDUs) described by the transfer syntax. Each PDU includes a plurality of components.

In order to input/refer a data value as one of the components, it is necessary to recognize the complex data structure of the abstract syntax. For that purpose, in the prior art, structures and a Value Tree List (VTL) must manually be generated on the basis of the abstract syntax. The value tree list is a table indicative of a matching between the generated structures and data values for the data structure of the abstract syntax. In addition, complicated interface conversion between the value tree list and a user program must manually be carried out. It is therefore necessary to carry out individual processings for encoding/decoding of OSI Application layer protocols, respectively.

As a result, it is difficult for the prior art to carry out input/reference of a desired data value. In particular, in a case where the data structure of the abstract syntax is complicated, lack of information occurs due to mistakes about the input/reference of the data value, it is difficult to understand the data structure of the abstract syntax itself, and it is necessary to carry out a lot of processings corresponding to each OSI Application layer protocol.

SUMMARY OF THE INVENTION

It is therefore an object of this invention to provide a protocol encoding/decoding device which is capable of easily carrying out input/reference of data values which are components of a protocol data unit without taking the complicated data structure of an abstract syntax into consideration.

It is another object of this invention to provide a protocol encoding/decoding device of the type described, which is capable of removing lack of information due to mistakes about input/reference of the data values.

It is still another object of this invention to provide a protocol encoding/decoding device of the type described, which is capable of easily understanding the data structure of the abstract syntax.

It is yet another object of this invention to provide a protocol encoding/decoding device of the type described, wherein it is unnecessary to carry out a lot of processings corresponding to each OSI application layer protocol.

Other objects of this invention will become clear as the description proceeds.

On describing the gist of an aspect of this invention, it is possible to understand that a protocol encoding/decoding device is for use in syntax conversion or translation between an abstract syntax for an application layer in Open Systems Interconnection (OSI) and a transfer syntax for a presentation layer in OSI. The abstract syntax is a set of data types described by an Abstract Syntax Notation One (ASN.1).

According to the above-mentioned aspect of this invention, the above-understood protocol encoding/decoding device comprises an abstract syntax storage for storing the abstract syntax therein. Connected to the abstract syntax storage, a structure generating unit automatically generates a frame of structures for input/reference of data values corresponding to data structure represented by the abstract syntax. Connected to the structure generating means, a structure storage stores the frame of the structures therein. Connected to the structure generating unit and the abstract syntax storage, a VTL function generating unit automatically generates a VTL function for a value tree list (VTL) which is a table indicative of a matching between the structures and the data values for the data structure represented by the abstract syntax. Connected to the VTL function generating unit, a VTL function storage stores the VTL function therein. Connected to the abstract syntax storage, an AST generating unit automatically generates an ASN.1 syntax tree (AST) which is a tree structure programmable from the data structure represented by the abstract syntax. Connected to the AST generating unit, an AST storage stores the AST therein. Connected to the AST storage and the VTL function storage, a PDU encoding/decoding unit encodes/decodes a protocol data unit (PDU) called by the VTL function on the basis of the AST. Connected to the VTL function storage and the structure storage, a user program inputs/refers to, by using the VTL function, the data values which are components of the PDU.

DESCRIPTION OF THE PREFERRED EMBODIMENT

Figure 1:
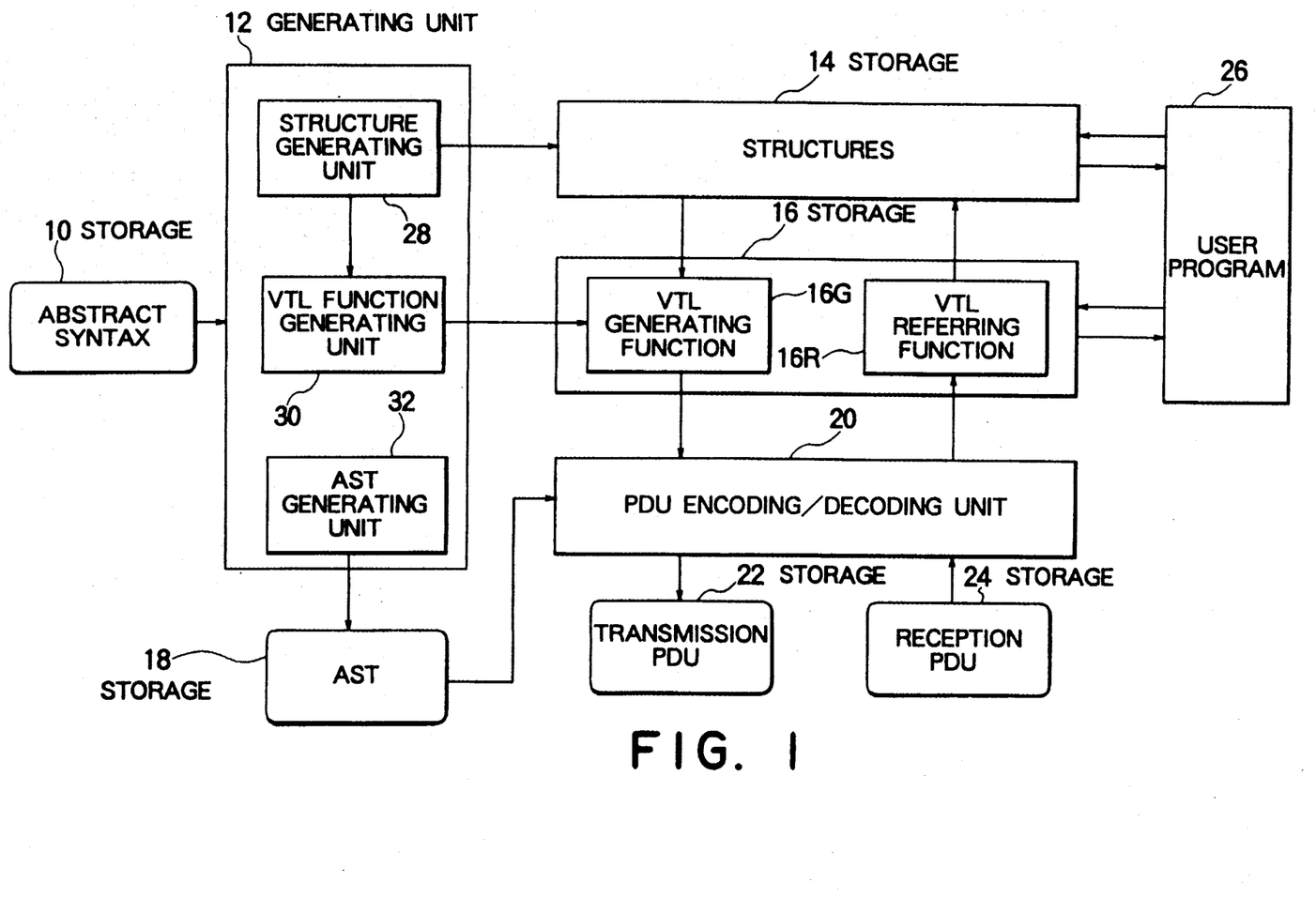
FIG. 1 is a block diagram of a protocol encoding/decoding device according to an embodiment of this invention.

Referring to FIG. 1, a protocol encoding/decoding device according to a preferred embodiment of the present invention is for use in syntax conversion or translation between the abstract syntax and the transfer syntax.

The illustrated protocol encoding/decoding device comprises an abstract syntax storage 10, a generating unit 12, a structure storage 14, a VTL function storage 16, an AST storage 18, a PDU encoding/decoding unit 20, a transmission PDU storage 22, a reception PDU storage 24, and a user program 26. The abstract syntax storage 10 stores the abstract syntax therein.

Figure 2:
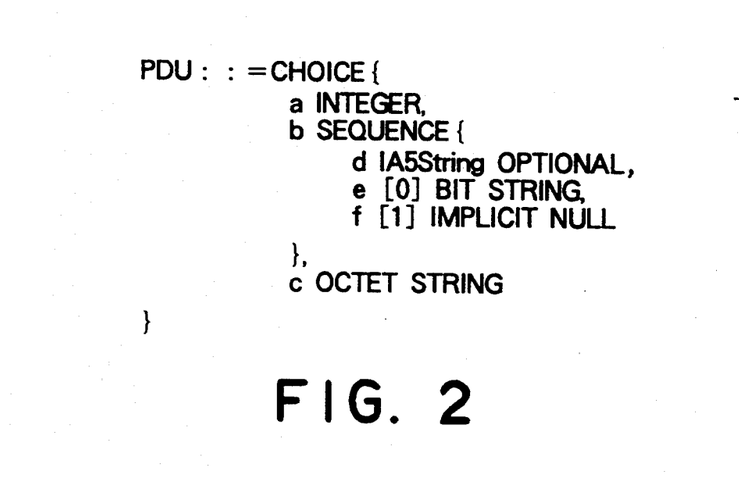
FIG. 2 shows an example of data structure of an abstract syntax.

FIG. 2 shows an example of data structure of the abstract syntax. In the example being illustrated, a PDU has a "CHOICE" data type which is any data type among a plurality of data types. The "CHOICE" data type nests an "INTEGER" data type denoted by a, a "SEQUENCE" data type denoted by b, and an "OCTET STRING" data type denoted by c. The "INTEGER" data type is a data type indicating an integer value. The "SEQUENCE" data type is a data type consisting of a sequence of values in a plurality of data types. The "OCTET STRING" data type is a data type indicating a sequence of octets each of which consists of eight bits. The "SEQUENCE" data type nests an "IA5 String OPTIONAL" data type denoted by d, a "[0] BIT STRING" data type denoted by e, and a "[1] IMPLICIT NULL" data type denoted by f. The "IA5 String OPTIONAL" data type is a data type indicating a sequence of optional characters defined by IA5/ISO 646. The "BIT STRING" data type is a data type indicating a sequence of bits. The "IMPLICIT NULL" data type is a data type of implicit null.

Figure 3:
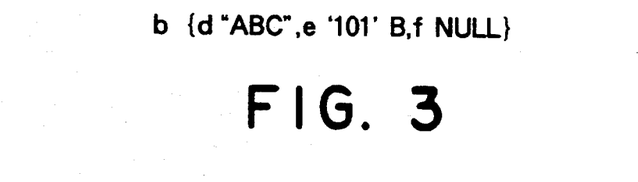
FIG. 3 shows an example of description of data values for the abstract syntax illustrated in FIG. 2.

Turning to FIG. 3, the abstract syntax illustrated in FIG. 2 is given with description of data values shown in FIG. 3. In the "SEQUENCE" data type illustrated in FIG. 2, the "IA5 String OPTIONAL" data type has a data value of "ABC" denoted by d, the "[0] BIT STRING" data type has a data value of '101'B denoted by e, and the "[1] IMPLICIT NULL" data type has a data value of NULL denoted by f.

Turning back to FIG. 1, the abstract syntax storage 10 is connected to the generating unit 12. The generating unit 12 comprises a structure generating unit 28, a VTL function generating unit 30, and an AST generating unit 32. The structure generating unit 28 reads the abstract syntax out of the abstract syntax storage 10 to automatically generate, on the basis of a predetermined conversion rule, structures corresponding to the data structure of the abstract syntax. The structure generating unit 28 writes the structures generated by the structure generating unit 28 in the structure storage 14. That is, the structure storage 14 stores the structures therein.

Figure 4:
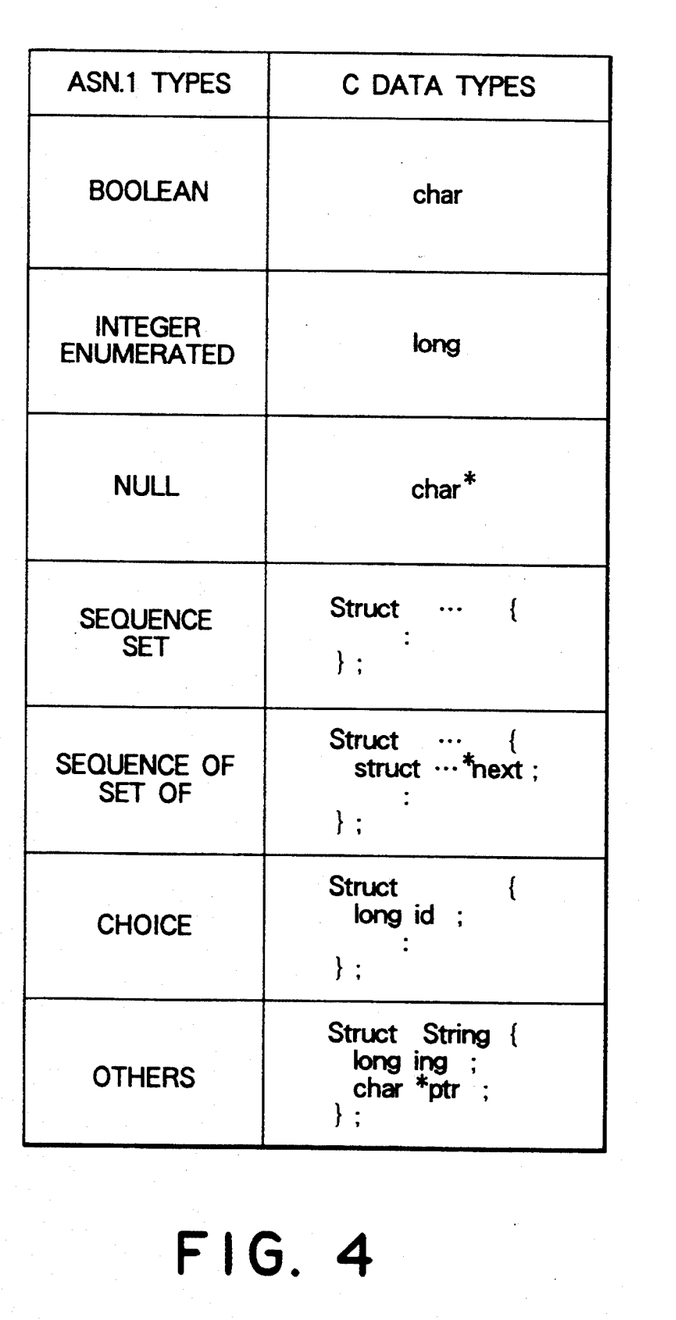
FIG. 4 shows an example of a conversion rule for a structure generating unit for use in the protocol encoding/decoding device illustrated in FIG. 1.

FIG. 4 shows an example of the conversion rule for the structure generating unit 28. In the example being illustrated, the conversion rule defines a conversion from the data types in the ASN.1 to data types in C language. FIG. 4 shows the data types in the ASN.1 (ASN.1 types) and the data types in the C language (C data types) in the left-hand and the right-hand sides thereof, respectively.

The ASN.1 types comprise a "BOOLEAN" data type, an "ENUMERATED" data type, a "SET" data type, a "SEQUENCE OF" data type, and a "SET OF" data type as well as the "INTEGER" data type, the "NULL" data type, the "SEQUENCE" data type, and the "CHOICE" data type which are already described in conjunction with FIG. 2. The "BOOLEAN" data type is a data type indicating either "true" or "false". The "ENUMERATED" data type is a data type indicating values of the finite number which is clearly defined. The "SET" data type is a data type consisting of a set of values in a plurality of data types. The "SEQUENCE OF" data type is a data type consisting of a sequence of values in a single data type. The "SET OF" data type is a data type consisting of a set of values in a single data type.

In the ASN.1 types, each of the "SEQUENCE", the "SET", and "CHOICE" data types is converted or translated into a structure type designated by "Struct" in the C language. As well known in the art, a structure consists of a set of data objects that can be referenced as one object. Such data objects are referred to as members of a structure. In particular, the "CHOICE" data type is converted or translated into the structure type including, as a first member, an integer data type, long, of a variable, id, designated by "long id" to identify an element selected by the "CHOICE" data type. The "SEQUENCE OF" data type and the "SET OF" data type are converted or translated into structure types each of which includes, as a first member, its own structure type, struct, of a variable, *next, designated by "struct . . . *next" to represent repetition of elements, where an asterisk, *, represents a pointer type. The "BOOLEAN" data type is converted or translated into a character data type, char, in the C language. The "INTEGER (ENUMERATED)" data type is converted or translated into the integer data type, long, in the C language. The "NULL" data type is converted or translated into the character data type, char, with a pointer *, designated by "char *". Each of other character string data types and time data types is converted or translated into the structure type including, as members, an element length and a starting address of elements which are designated by "long ing" and "char *ptr" respectively.

Figure 5:
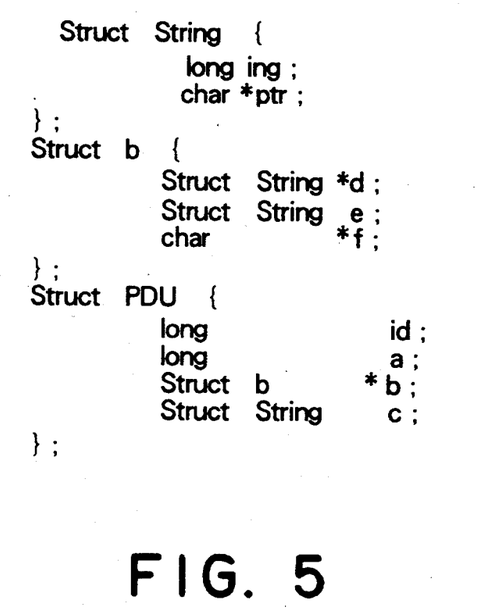
FIG. 5 shows an example of structures generated by the structure generating unit in a case where an abstract storage stores therein the abstract syntax illustrated in FIG. 2.

FIG. 5 shows an example of the structures generated by the structure generating unit 28 in a case where the abstract syntax storage 10 stores therein the abstract syntax illustrated in FIG. 2.

Turning back to FIG. 1, the VTL function generating unit 30 reads the abstract syntax out of the abstract syntax storage 10 to automatically generate a VTL function. In the manner which will later be described, the protocol encoding/decoding device is operable in one of an encoding mode and a decoding mode at a time. In the encoding mode, the VTL function generating unit 30 automatically generates a VTL generating function 16G as the VTL function. In the decoding mode, the VTL function generating unit 30 automatically generates a VTL referring function 16R as the VTL function.

The VTL function storage 16 is connected to the VTL function generating unit 30 and stores therein the VTL function generated by the VTL function generating unit 30. In particular, the VTL function storage 16 stores therein the VTL generating function 16G in the encoding mode and stores therein the VTL referring function 16R in the decoding mode. Description will later be made as regards operation of the VTL generating function 16G and the VTL referring function 16R.

Figure 6:
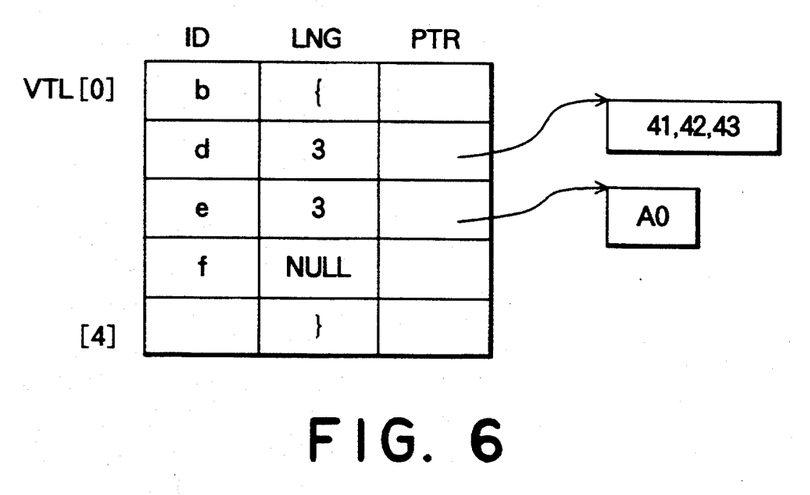
FIG. 6 shows an example of a value tree list (VTL) in a case where the data values illustrated in FIG. 3 are given to the frame of the data structure of the abstract syntax illustrated in FIG. 2.

FIG. 6 shows an example of the VTL in a case where the data values illustrated in FIG. 3 are given to the data structure of the abstract syntax illustrated in FIG. 2. The illustrated VTL consists of zeroth through fourth VTL components which are depicted as VTL[0] to VTL[4], respectively. Each of the zeroth through the fourth VTL components comprises an identifier field, a length field, and an address field which are labelled ID, LNG, and PTR, respectively. The identifier field ID is for identifying each data type in the abstract syntax. The length field LNG indicates a length of each data value indicated by the description of the data values shown in FIG. 3. The address field PTR indicates an address for a memory area in which the data value indicated by the description of the data values shown in FIG. 3 is to be stored. The zeroth and the fourth VTL components VTL[0] and VTL[4] store, in the length fields LNGs thereof, "{" and "}" which represent a start ('{') and an end ('}') of the "SEQUENCE" data type in the abstract syntax illustrated in FIG. 2.

Turning back to FIG. 1, the AST generating unit 32 reads the abstract syntax out of the abstract syntax storage 10 to automatically generate an AST. The AST represents data structure of the abstract syntax. The AST storage 18 is connected to the AST generating unit 32 and stores therein the AST generated by the AST generating unit 32.

Figure 7:
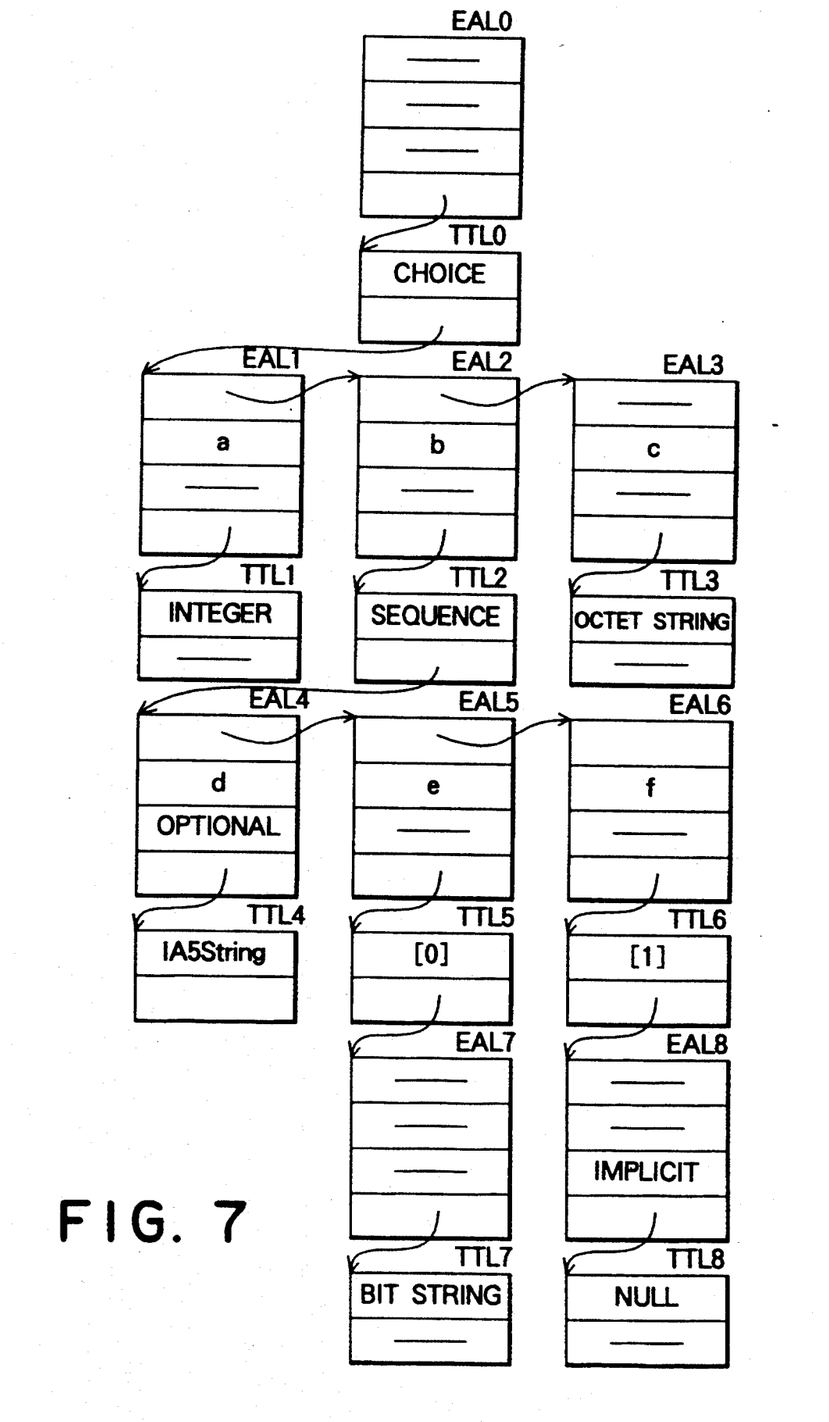
FIG. 7 shows an example of an ASN.1 syntax tree (AST) in a case where the abstract storage stores therein the abstract syntax illustrated in FIG. 2.

FIG. 7 shows an example of the AST in a case where the abstract syntax storage 10 stores therein the abstract syntax illustrated in FIG. 2. The AST means a tree structure programmable from the data structure represented by the abstract syntax.

Turning back to FIG. 1, the user program 26 is connected to the structure storage 14 and the VTL function storage 16. By using the structures stored in the structure storage 14 and the VTL function stored in the VTL function storage 16, the user program 26 carries out input/reference of data values which are components of the PDU.

The PDU encoding/decoding unit 20 is connected to the AST storage 18, the VTL function storage 16, the transmission PDU storage 22, and the reception PDU storage 24. In the encoding mode, the PDU encoding/decoding unit 20 encodes a transmission PDU on the basis of the AST stored in the AST storage 18 by referring to the VTL generated by the VTL generating function 16G in the manner which later become clear. The transmission PDU encoded in the PDU encoding/decoding unit 20 is stored in the transmission PDU storage 22. The reception PDU storage 24 stores a reception PDU therein. In the decoding mode, the PDU encoding/decoding unit 20 decodes the reception PDU stored in the reception PDU storage 24 on the basis of the AST stored in the AST storage 18 to generate the VTL in the manner which later become clear.

Figure 8:
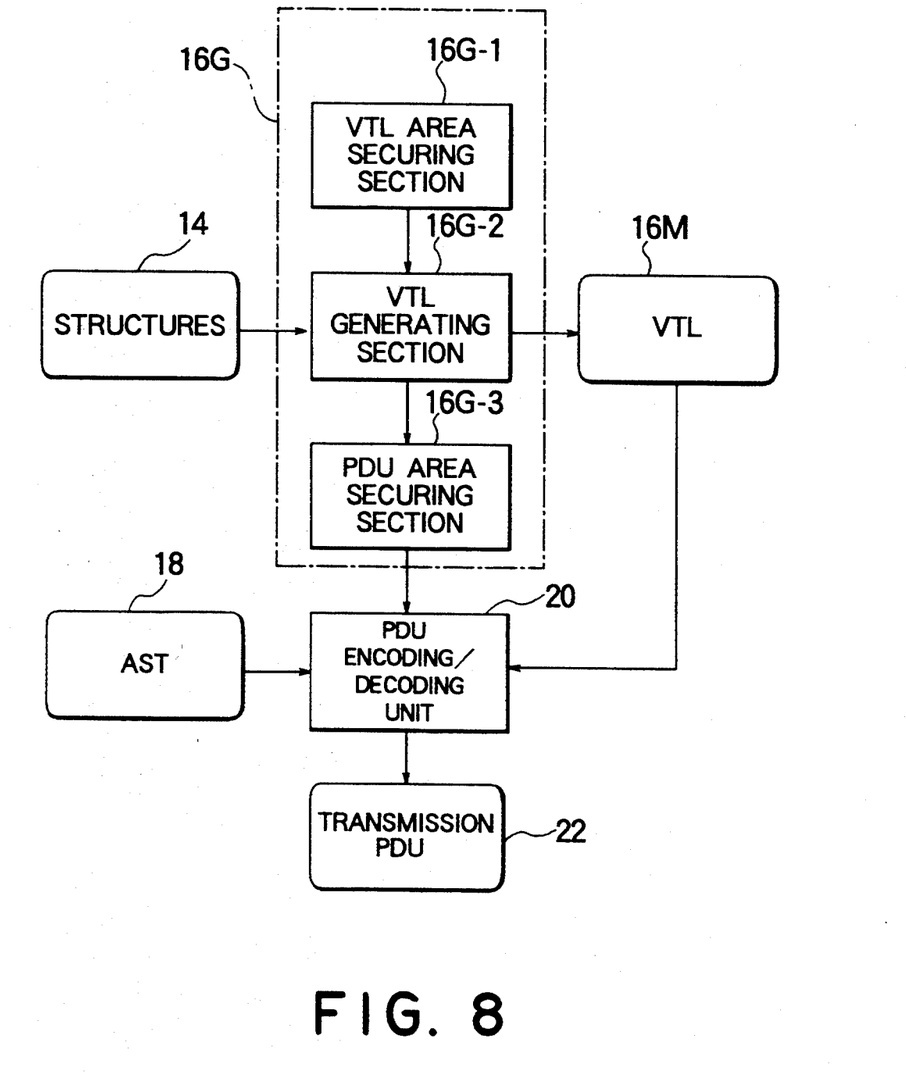
FIG. 8 is a block diagram for describing, on an encoding mode, operation of a VTL generating function for use in the protocol encoding/decoding device illustrated in FIG. 1.

Referring to FIG. 8 in addition to FIG. 1, description will proceed to operation of the VTL generating function 16G on the encoding mode. The user program 26 inputs desired data values for the structures which are generated by the structure generating unit 28 and which are shown in FIG. 5. Subsequently, the user program 26 calls the VTL generating function 16G stored in the VTL function storage 16. The VTL generating function 16G comprises a VTL area securing section 16G-1, a VTL generating section 16G-2, and a PDU area securing section 16G-3. The VTL area securing section 16G-1 secures a VTL area 16M for the VTL into which the structures illustrated in FIG. 5 are converted. The VTL generating section 16G-2 generates the VTL on the basis of the data structure of the abstract syntax shown in FIG. 2 by referring to the structures shown in FIG. 5. The generated VTL is stored in the VTL area 16M secured by the VTL area securing section 16G-1. The PDU area securing section 16G-3 secures a PDU area for the transmission PDU as the transmission PDU storage 22. The PDU encoding/decoding unit 20 encodes the transmission PDU on the basis of the AST stored in the AST storage 18 by referring to the VTL stored in the VTL area 16M. The encoded transmission PDU is stored in the transmission PDU storage 22.

Figure 9:
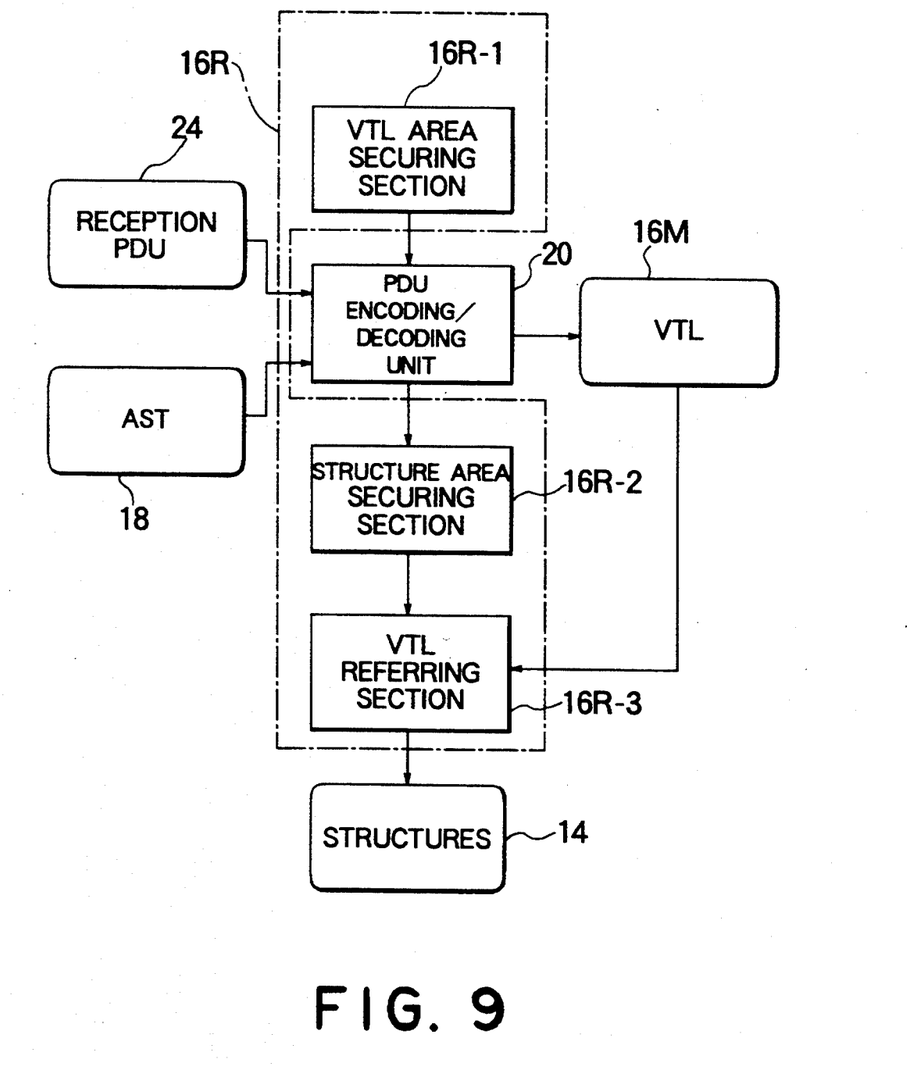
FIG. 9 is a block diagram for describing, on a decoding mode, operation of a VTL referring function for use in the protocol encoding/decoding device illustrated in FIG. 1.

Referring to FIG. 9 in addition to FIG. 1, description will proceed to operation of the VTL referring function 16R on the decoding mode. The user program 26 receives the reception PDU stored in the reception PDU storage 24. Subsequently, the user program 26 calls the VTL referring function 16R stored in the VTL function storage 16. The VTL referring function 16R comprises a VTL area securing section 16R-1, a structure area securing section 16R-2, and a VTL referring section 16R-3. The VTL area securing section 16R-1 secures the VTL area 16M for the VTL. The PDU encoding/decoding unit 20 decodes the reception PDU stored in the reception PDU storage 24 on the basis of the AST stored in the AST storage 18 to generate the VTL. The VTL is stored in the VTL area 16M. The structure area securing section 16R-2 secures a structure area for the structures as the structure storage 14. The VTL referring section 16R-3 refers to the VTL stored in the VTL area 16M to store the data values in the structure storage 14 so as to modify the structures. The modified structures are stored in the structure storage 14. By referring to the structures stored in the structure storage 14, the user program 26 can easily refer to any data value which is one of the components of the reception PDU.

As apparent from the above-description, according to this invention, on carrying out encoding/decoding of the PDU, it is possible to easily carry out input/reference of data values which are components of the PDU without taking complicated data structure of the abstract syntax into consideration. This is because the data value is defined by the structures and an interface conversion between the VTL and the user program is carried out by using the VTL function. It is therefore possible to remove lack of information due to mistakes about input/reference of the data values.

While this invention has thus far been described in conjunction with a preferred embodiment thereof, it will now be readily possible for those skilled in the art to put this invention into practice in various other manners.

What is claimed is:

1. A protocol encoding device for use in encoding an abstract syntax for an application layer in Open Systems Interconnection (OSI) into a transfer syntax for a presentation layer in OSI, said abstract syntax being a set of data types described by an abstract syntax Notation One (ASN. 1), said abstract syntax representing a data structure which is defined by the data types in the ASN.1 and data values corresponding to the data types in the ASN.1, said transfer syntax being a protocol data unit (PDU) having said data values, said protocol encoding device comprising:

an abstract syntax storage for storing said abstract syntax therein;
  a structure generating unit, connected to said abstract syntax storage, for automatically generating, on the basis of a predetermined conversion rule, structures corresponding to the data structure represented by said abstract syntax, said structures being defined by data types in C language, said predetermined conversion rule defining a conversion from the data types in the ASN.1 to data types in C language;
  a structure storage, connected to said structure generating unit, for storing said structures therein;
  a value tree list (VTL) generating unit, connected to said structure storage, for automatically generating a VTL on the basis of the data values stored in said structure storage, the VTL being a table indicative of said data values;
  an ASN.1 syntax tree (AST) generating unit, connected to said abstract syntax storage, for automatically generating an AST on the basis of the data structure represented by said abstract syntax, said AST representing the data structure of said abstract syntax;
  an AST storage, connected to said AST generating unit, for storing said AST therein; and
  a PDU encoding unit, connected to said AST storage and said VTL generating unit, for encoding said abstract syntax into said PDU on the basis of said AST and said VTL.

2. A protocol decoding device for use in decoding a transfer syntax for a presentation layer in Open Systems Interconnection (OSI) into an abstract syntax for an application layer in OSI, said abstract syntax being a set of data types described by an abstract syntax Notation One (ASN.1), said abstract syntax representing a data structure which is defined by the data types in the ASN.1 and data values corresponding to the data types in the ASN.1, said transfer syntax being a protocol data unit (PDU) having said data values, said protocol decoding device comprising:

an abstract syntax storage for storing said abstract syntax therein;
  a structure generating unit, connected to said abstract syntax storage, for automatically generating, on the basis of a predetermined conversion rule, structures corresponding to the data structure represented by said abstract syntax, said structures being defined by data types in C language, said predetermined conversion rule defining a conversion from the data types in the ASN.1 to the data types in the C language;
  a structure storage, connected to said structure generating unit, for storing said structures therein;
  an ASN.1 syntax tree (AST) generating unit, connected to said abstract syntax storage, for automatically generating an AST on the basis of the data structure represented by said abstract syntax, said AST representing the data structure of said abstract syntax;
  an AST storage, connected to said AST generating unit, for storing said AST therein;
  a PDU decoding unit, supplied with said PDU and connected to said AST storage, for decoding said PDU on the basis of said AST to generate a value tree list (VTL) which is a table indicative of said data values;
  a VTL referring unit, connected to said PDU decoding unit and said structure storage, for referring to said VTL to store said data values in said structure storage; and
  a user program, connected to said structure storage, for referring to said data values stored in said structure storage.

* * * * *